United States Patent
Couillais et al.

(10) Patent No.: US 6,893,198 B2
(45) Date of Patent: May 17, 2005

(54) SELF-ATTACHING FEMALE FASTENER ELEMENT AND METHOD OF ATTACHMENT

(75) Inventors: Yvan A. Couillais, Livonia, MI (US); Harold A. Ladouceur, Livonia, MI (US)

(73) Assignee: FabriSteel Products, Inc., Taylor, MI (US)

( * ) Notice: Subject to any disclaimer, the term of this patent is extended or adjusted under 35 U.S.C. 154(b) by 0 days.

(21) Appl. No.: 10/691,921

(22) Filed: Oct. 23, 2003

(65) Prior Publication Data

US 2004/0086355 A1 May 6, 2004

Related U.S. Application Data

(60) Provisional application No. 60/420,659, filed on Oct. 23, 2002.

(51) Int. Cl.[7] ................................................. F16B 37/04
(52) U.S. Cl. ......................................... 411/181; 29/525
(58) Field of Search .................. 411/179–183, 185–188, 411/171; 29/603, 614, 578, 578.2, 388.6, 525, 525.05, 525.06, 505, 525.11; 470/906, 167

(56) References Cited

U.S. PATENT DOCUMENTS

| | | | | |
|---|---|---|---|---|
| 158,259 A | * | 12/1874 | Dulin ........................... 285/40 |
| 264,626 A | * | 9/1882 | Clark ........................... 411/160 |
| 359,394 A | * | 3/1887 | Winniatt ....................... 285/66 |
| 1,332,686 A | | 3/1920 | Reynolds | |
| 1,579,875 A | * | 4/1926 | Lundberg ..................... 411/180 |
| 1,591,183 A | | 7/1926 | Reynolds | |
| 2,238,488 A | * | 4/1941 | Foskett ......................... 52/513 |
| 2,329,935 A | * | 9/1943 | Nowak et al. ................. 285/19 |
| 2,591,631 A | * | 4/1952 | Stanitski ................ 301/35.623 |
| 2,679,880 A | * | 6/1954 | Poupitch ...................... 411/134 |
| 2,968,713 A | * | 1/1961 | Harper ........................... 219/93 |
| 3,133,579 A | * | 5/1964 | Grimm et al. .............. 411/180 |
| 3,170,701 A | * | 2/1965 | Hoover ........................ 411/542 |
| 3,187,424 A | | 6/1965 | Double et al. | |
| 3,213,914 A | * | 10/1965 | Baumle et al. .............. 411/179 |
| 3,736,969 A | * | 6/1973 | Wam et al. .................. 411/179 |
| 4,431,353 A | * | 2/1984 | Capuano ........................ 411/11 |
| 4,432,681 A | * | 2/1984 | Capuano ..................... 411/180 |
| 4,574,473 A | * | 3/1986 | Sawdon ........................ 29/798 |
| 4,724,610 A | * | 2/1988 | Muller .......................... 29/798 |
| 4,809,437 A | * | 3/1989 | Saliaris ........................ 30/319 |
| 5,085,550 A | * | 2/1992 | Kendrick ..................... 411/432 |

(Continued)

FOREIGN PATENT DOCUMENTS

GB          978604          12/1964

OTHER PUBLICATIONS

PCT/US03/33959 International Search Report.

*Primary Examiner*—Robert J. Sandy
*Assistant Examiner*—Jeffrey A. Sharp
(74) *Attorney, Agent, or Firm*—Howard & Howard

(57) ABSTRACT

A self-attaching female fastener having a generally cylindrical body including opposed annular ends, a bore extending through the annular ends of the body including an inclined frustoconical outer surface and a radial flange portion integral with the body midway between the opposed ends having parallel outer surfaces surrounding the body. The fastener is symmetrical about a plane perpendicular to the bore longitudinal axis. The parallel surfaces of the flange include radial grooves spaced from the body and the outer surface of the flange is tapered inwardly to a rounded outer edge. The installation method includes receiving either end of the body through an opening in the panel, which may be pierced by the annular end, deforming the annular outer periphery of the flange toward the end of the body received through the panel opening forming an annular groove surrounding the body and deforming an annular portion into the annular groove.

24 Claims, 2 Drawing Sheets

U.S. PATENT DOCUMENTS

| | | |
|---|---|---|
| 5,782,594 A | 7/1998 | Muller |
| 5,888,012 A * | 3/1999 | Nygren et al. ................ 403/13 |
| 6,004,087 A | 12/1999 | Muller |
| 6,146,072 A | 11/2000 | Muller |
| 6,146,076 A * | 11/2000 | Bodin ........................ 411/433 |
| 6,257,814 B1 | 7/2001 | Muller |
| 6,595,734 B2 * | 7/2003 | Duran et al. ................ 411/427 |
| 2004/0042871 A1 * | 3/2004 | Wojciechowski et al. ... 411/181 |

* cited by examiner

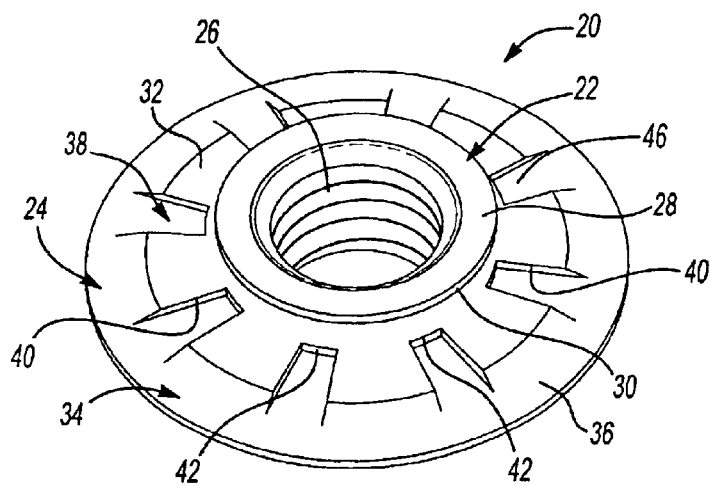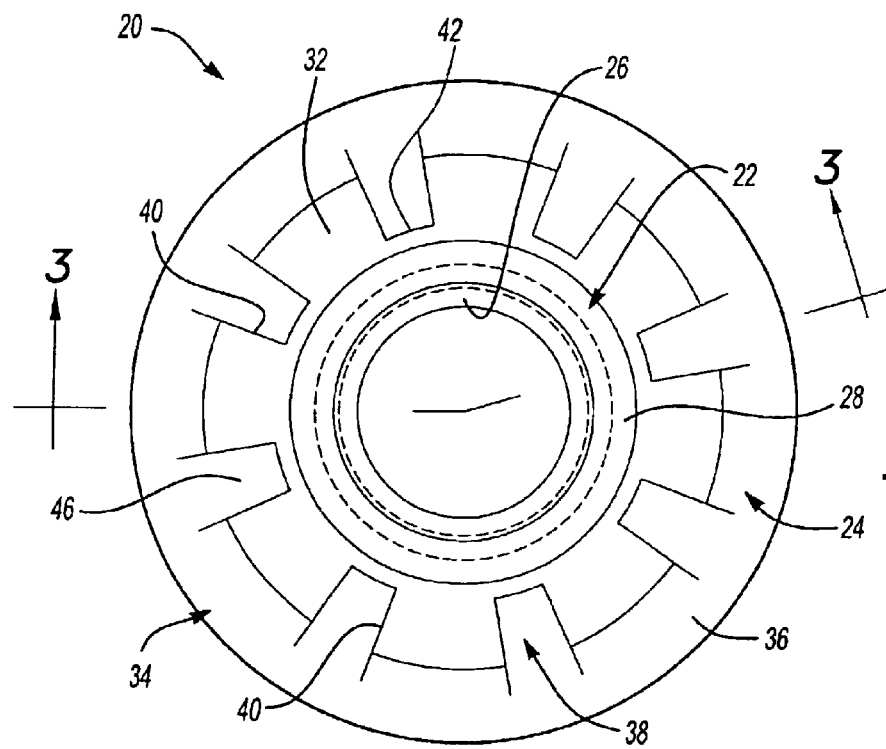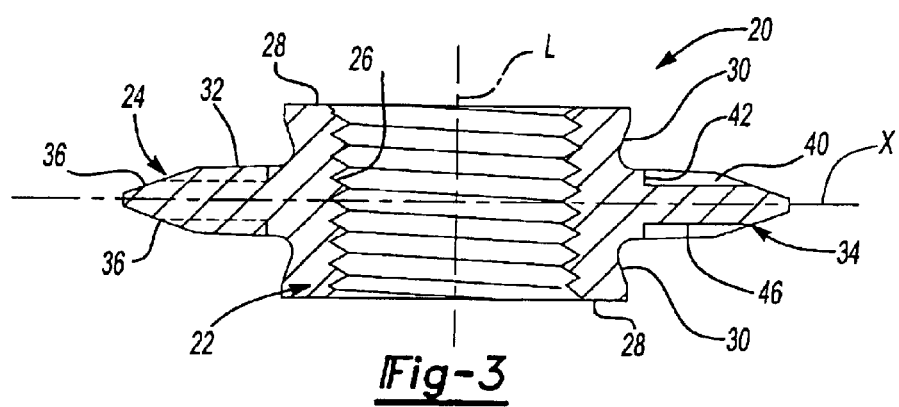

SELF-ATTACHING FEMALE FASTENER ELEMENT AND METHOD OF ATTACHMENT

RELATED APPLICATIONS

This application claims priority to a U.S. Provisional Patent Application Ser. No. 60/420,659 filed Oct. 23, 2002.

FIELD OF THE INVENTION

The present invention relates to self-attaching female fastener elements including pierce and clinch nuts which may be formed by conventional cold header techniques wherein the female fastener element may be symmetrical about a plane perpendicular to the longitudinal axis of the fastener bore to eliminate orientation of the fastener element prior to installation and method of installation which forms a flush mounting in a panel.

BACKGROUND OF THE INVENTION

Self-attaching female fastener elements, including pierce and clinch nuts formed by cold heading techniques, are well known in the art. A pierce nut pierces an opening in a panel during installation and a pilot portion of the pierce nut is received through the pierced panel opening during attachment. A clinch nut is attached to a panel having a preformed or prepierced opening. As used herein, the term self-attaching female fastener element is intended to be generic to pierce and clinch female fastener elements, including pierce and clinch nuts. Such self-attaching female fastener elements are, however, asymmetrical and must therefore be oriented in an installation head prior to installation in a panel.

Pierce and clinch nuts manufactured by the assignee of this application are conventionally installed in mass production applications and used by the automotive and appliance industries to interconnect components of an assembly. In a typical application, an installation head having a reciprocating plunger is installed in one platen of a die press, typically the upper die platen, and a die member or die button is installed in the opposite die platen, typically the lower die platen. The self-attaching female fastener elements are then fed through a chute from a hopper to the installation head and a self-attaching fastener is installed in a panel with each stroke of the die press. However, because the self-attaching female fastener elements are asymmetrical, the female fastener elements must be oriented prior to receipt in the feed chute, typically in the hopper. As will be understood by those skilled in this art, orientation of the fastener elements significantly reduces the feed rate of the female fastener elements to the installation head and requires special orientation equipment.

The panel to which the female fastener element is attached may be simultaneously formed by the die press during each stroke of the die press. Thus, the feed rate also affects the cycling of the die press during forming of the panel. In a typical application, the panel is attached to another component of the assembly by a bolt, screw or other male threaded fastener which is received in the bore of the self-attaching female fastener element. It is, therefore, advantageous that the female fastener element form a flush mounting with the panel to avoid the requirement for embossing the panel or providing a spacer when attaching a component to the panel. As will be understood by those skilled in this art, a flush mounted self-attaching female fastener element does not project beyond one plane of the panel following attachment.

The self-attaching female fastener element and method of installation of this invention avoids the problems associated with the prior art and may be formed by conventional cold forming techniques, including cold heading or progressive die techniques.

SUMMARY OF THE INVENTION

As set forth above, the self-attaching female fastener element of this invention may be used as a pierce or clinch nut. The self-attaching female fastener element includes a body portion having opposed ends and a bore extending through the body portion through the opposed ends, and a radial flange portion integral with the body portion midway between the opposed ends having generally parallel planar annular surfaces on opposed sides of the radial flange portion surrounding the body portion, such that the female fastener element may be symmetrical with respect to a plane perpendicular to the longitudinal axis of the bore. The bore may be threaded for receipt of a conventional bolt or the bore may be smooth for receipt of a thread forming or thread rolling bolt or screw. In one preferred embodiment, the outer peripheral portion of the flange portion is inwardly radially tapered and forms a bearing surface supporting the panel as described below with regard to the method of installation. The preferred embodiment further includes tapered or frustoconical surfaces adjacent the ends of the body portion which improves the retention of the self-attaching female fastener element following installation on a panel.

Antirotation means may also be provided, wherein the generally planar parallel surfaces surrounding the end portions of the body portion include radial grooves or recesses preferably having radial side walls and bottom walls preferably spaced below the generally planar side surfaces of the radial flange portion. In a preferred embodiment, the radial grooves are spaced from the body portion and extend to the inwardly tapered annular outer peripheral edge portion. Thus, a preferred embodiment of the self-attaching female fastener element of this invention is symmetrical with respect to a plane perpendicular to the longitudinal axis of the bore and may be formed by conventional cold forming techniques. As used herein, the term "cold forming" includes any die forming method including progressive die forming methods and subsequent steps or operations.

The method of attaching a self-attaching female fastener element of this invention to a panel includes receiving either one of the end portions of the symmetrical body portion through an opening in the panel. Where the self-attaching female fastener element is utilized as a pierce nut, the panel opening is pierced by driving either end of the body portion against the panel, thereby forming the panel opening. Alternatively, where the self-attaching female fastener element is utilized as a clinch nut, the panel opening is formed prior to receipt of the end portion of the body portion in the panel opening. Then, preferably simultaneously and during a single stroke of the die press, the method of this invention includes deforming the annular outer peripheral portion of the radial flange portion toward the end of the body portion received through the opening in the panel forming a U-shaped portion with the end of the body portion including an annular groove surrounding the body portion and deforming an annular portion of the panel surrounding the panel opening into the annular groove and against the bottom wall of the groove.

Where the annular outer peripheral portion of the radial flange portion includes inwardly radially tapered surfaces, as described above, the method of this invention preferably includes deforming the annular outer peripheral portion toward the end of the body portion until the adjacent tapered surface is generally perpendicular to the longitudinal axis of the bore, thereby forming an annular bearing surface which supports the panel following installation. In a preferred embodiment, wherein the end portions of the body portion are inclined radially, forming frustoconical surfaces adjacent the ends of the body portion on opposed sides of the flange portion, the panel metal surrounding the panel opening is simultaneously deformed beneath the frustoconical surface forming a more secure installation having improved push-off strength. Where the fastener installation requires torsion resistance for preventing rotation of the fastener relative to the panel, the panel metal is simultaneously deformed into the radial grooves which, in the disclosed embodiment, are located in the annular surface surrounding the flange portion, preventing rotation of the self-attachment element relative to the panel.

Other advantages and meritorious features of the self-attaching fastening element and method of installation of this invention will be more fully understood from the following description of the preferred embodiments, the appended claims and the drawings, a brief description of which follows.

BRIEF DESCRIPTION OF THE DRAWINGS

FIG. 1 is a top perspective view of one preferred embodiment of the self-attaching female fastener element of this invention;

FIG. 2 is a top view of the female fastener element of FIG. 1;

FIG. 3 is a side cross sectional view of FIG. 2 in the direction of view arrows 3—3;

DESCRIPTION OF THE PREFERRED EMBODIMENTS

Figure 4:
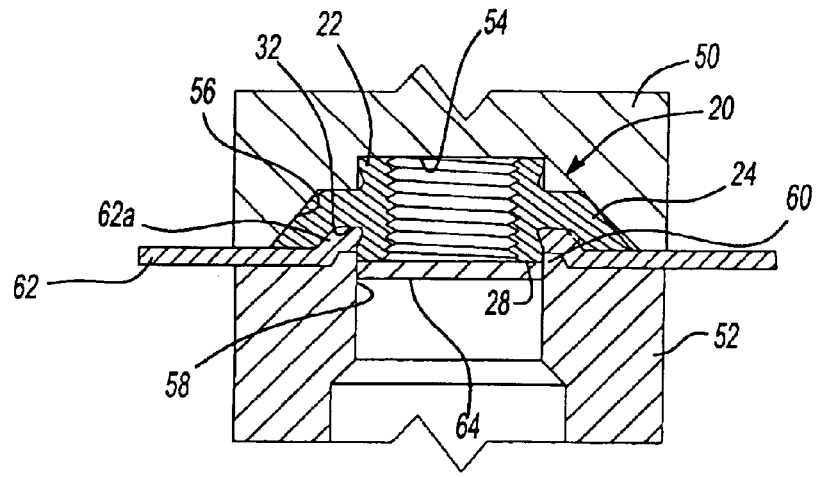
FIG. 4 is a cross sectional view of the self-attaching fastener element shown in FIGS. 1 to 3 during installation of the fastener element in a panel illustrating a method of installing the fastener element in a panel.
Figure 5:
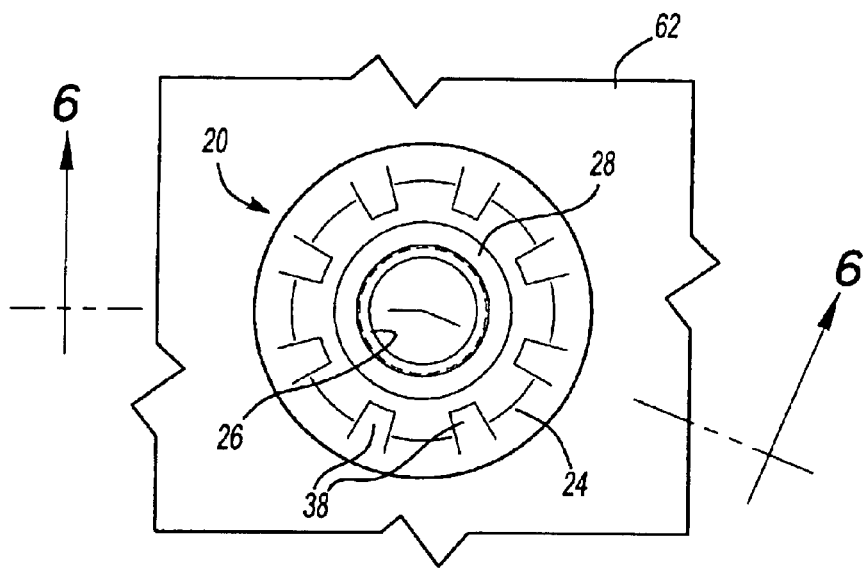
FIG. 5 is a top view of the fastening element and panel assembly of FIG. 4.

The embodiment of the self-attaching female fastener element 20 shown in FIGS. 1 to 3 includes a generally cylindrical body portion 22 and a radial flange portion 24. The body portion 22 in the disclosed embodiment includes a threaded bore 26 which extends through the body portion through the opposed end faces 28. The end faces 28 in the disclosed embodiment are preferably planar when the self-attaching fastener element 20 is used as a self-piercing female fastener or pierce nut. The outer surface of the end portions of the body portion 22 are inclined outwardly from adjacent the radial flange portion 24 forming generally frustoconical surfaces 30 as shown in FIG. 3.

As best shown in FIG. 3, the radial flange portion 24 is integrally joined with the body portion 22 midway between the end faces 28 of the body portion, preferably such that the length of the end portions of the body portion 22 measured from the radial flange portion 24 are equal, such that the fastener element 20 is symmetrical with respect to a plane x perpendicular to the longitudinal axis L shown in FIG. 3. The fastening element 20 is also symmetrical with respect to the longitudinal axis L, such that the fastening element 20 may be fed to an installation head without orienting the fastening element relative to the panel, as discussed further below.

The flange portion 24 in the disclosed embodiment includes parallel generally planar parallel surfaces 32 on opposed sides of the flange portions and a radially inwardly tapered peripheral edge portion 34 having annular planar tapered surfaces 36. As shown, the outer peripheral surface of tapered surface 36 is circular; however, flats (not shown) may be included on the outer surface to improve feeding such as two or more flats. For example only, the peripheral edge portion 34 may be polygonal or include for example six to eight flats providing additional torque resistance preventing rotation of the fastener relative to a panel following installation. The disclosed embodiment of the self-attaching fastener 20 of this invention includes further antirotation means in the form of radial grooves as now described. In the disclosed embodiment, the parallel generally planar surfaces 32 on opposed sides of the flange portion 24 includes radial grooves 38 each having radial side walls 40, an inner end wall 42, preferably spaced from the body portion 22, as best shown in FIG. 1, and a planar bottom wall 46 spaced below the plane of the generally planar surfaces 32.

FIG. 4 illustrates one preferred method of installing the fastener element 20 of this invention in a panel and suitable tooling for the installation. The installation tooling shown in FIG. 4 includes a plunger 50 which, as set forth above, may be a reciprocal plunger of an installation head (not shown) installed in an upper die shoe of a die press. The lower die shoe (not shown) may then include a die member or die button 52 which receives and supports the panel 62 to which the female fastener element 20 is installed. The plunger 50 shown in FIG. 4 includes an opening 54 configured to receive the body portion 22 of the female fastener element 20 and a tapered or frustoconical surface 56 which deforms the radial flange portion 24 of the fastener element 20 as described below. The die button 52 includes an opening 58 having an internal diameter approximately equal to the external diameter of the end of the body portion 22 and which receives the slug 64 pierced from the panel 62 during the installation process where the self-attaching female fastener 20 is utilized as a pierce nut or the opening may be preformed in the panel where the female fastener element 20 is utilized solely as a clinch nut. The die button 52 further includes an annular projecting lip 60 surrounding the opening 58 which deforms the panel metal surrounding the panel opening 62a into the annular groove surrounding the body portion 22 during installation as now described with regard to FIGS. 4 and 6.

During installation of the female fastener element 20 when utilized as a pierce nut in a panel 62, either annular end face 28 of the body portion 22 is first driven against the panel and the panel is then pierced between the end face 28 and the projecting annular lip 60 of the die button 52, forming a panel slug 64 and an opening in the panel as shown in FIG. 4. The annular lip 60 then deforms an annular portion 62a of the panel toward the planar portion 32 of the female fastener element 20 and the radially inwardly tapered peripheral edge portion 34 of the female fastener element 20 is simultaneously deformed generally longitudinally until the annular planar tapered surface 36 is U-shaped in cross-section and substantially perpendicular to the longitudinal axis L by the frustoconical surface 56 of the plunger 50 as shown in FIG. 4 thereby forming an annular groove surrounding the projecting end of the body portion 22. The panel portion 62a is substantially simultaneously deformed against the planar annular surface 32 and radially inwardly beneath the inclined frustoconical surface 30 forming a secure installation and preventing push-off of the female fastener element 20 from the panel 62.

Figure 6:
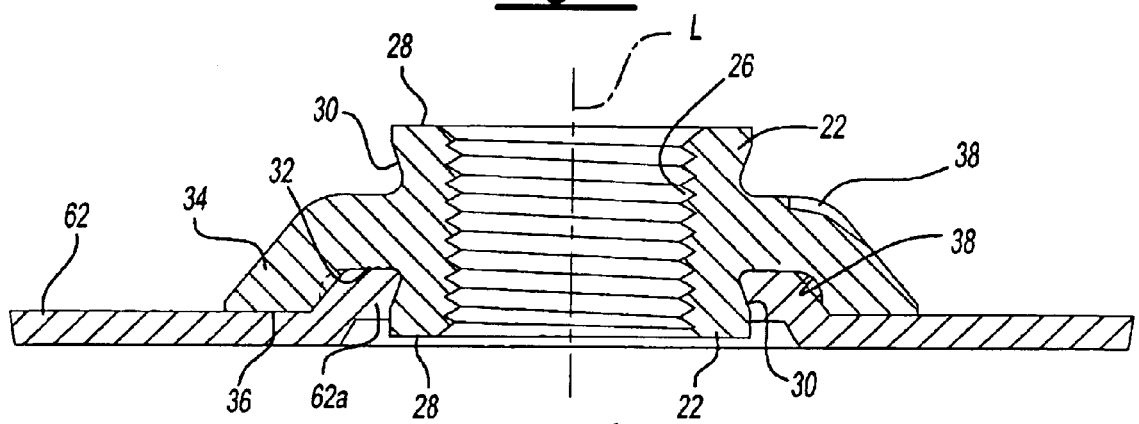
FIG. 6 is a cross sectional view of the fastening element and panel assembly shown in FIG. 5 in the direction of view arrows 6—6.

Simultaneously, the panel portion 62a is deformed into the radial grooves 38 in the planar surface 32, preventing rotation of the fastener element 20 relative to the panel 62. As shown in FIG. 6, the fastener element 20 is flush mounted in the panel 62. That is, the end face 28 of the body portion 22 does not project beyond the opposed surface of the panel 62. This is important because the fastener element 20 may then be utilized to secure a component (not shown) to the panel 62, such as a bracket or other component, which lies flush with the panel 62 at the bottom of FIG. 6. The second component (not shown) may then be attached to the panel 62 by receiving a threaded bolt or screw in the threaded opening 26 through an opening in the second component.

As will now be understood, the self-attaching female fastener element 20 is symmetrical with respect to a plane X perpendicular to the longitudinal axis L shown in FIG. 3, for example, and may thus be fed to the installation head (not shown) and presented in either orientation to the panel 62. Further, the female fastener element of this invention forms a secure installation with the panel 62, particularly where the end portions of the body portion 22 include frustoconical surfaces 30 and the fastener element includes antirotation means which, as set forth above, may be provided by the radial grooves 38 in the planar surfaces 32.

As will be understood, various modifications may be made to the self-attaching female fastener element 20 and the method of installation of this invention within the purview of the appended claims. The fastener element 20 is preferably formed of a deformable metal, such as low to medium carbon steel, which is preferably not heat treated. However, depending upon the installation, the fastener element 20 may also be formed of other metals, including aluminum, brass, etc., particularly where the fastener element is utilized solely as a clinch nut. The antirotation means may also be provided in the frustoconical surfaces 30 by providing axial grooves in the frustoconical surfaces or the end portions of the body portion may be polygonal, such as octagonal. Further, the bore 26 may be unthreaded for receipt of a thread forming or thread rolling male fastener element. Having described the preferred embodiments of the self-attaching female fastener element and method of this invention, the invention is now claimed, as follows.

What is claimed is:

1. A self-attaching female fastener element, comprising:
a generally cylindrical body portion having opposed end portions, a bore extending through said body portion through said end portions and said end portions each including a radially outwardly inclined generally frustoconical surface; and
a radial flange portion integral with said body portion midway between said opposed end portions having generally parallel annular surfaces on opposed sides of said radial flange portion surrounding said body portion.

2. The self-attaching female fastener element as defined in claim 1, wherein said self-attaching female fastener element is symmetrical about a plane perpendicular to a longitudinal axis of said bore.

3. The self-attaching female fastener element as defined in claim 1, wherein said radial flange portion includes an inwardly tapered annular outer peripheral edge portion.

4. The self-attaching female fastener element as defined in claim 1, wherein said generally parallel annular surfaces on opposed sides of said radial flange portion each include a plurality of radial grooves.

5. The self-attaching female fastener element as defined in claim 1, wherein said radial flange portion includes a circular outer peripheral edge.

6. The self-attaching female fastener element as defined in claim 4, wherein said radial grooves each include radial side walls and a bottom wall spaced below a plane of said generally planar annular surfaces.

7. The self-attaching female fastener element as defined in claim 4, wherein said radial grooves are each spaced from said body portion.

8. A clinch-type female fastener, comprising:
a body portion having opposed ends, a bore extending through said body portion through said opposed ends, a radial flange portion integral with said body portion midway between said opposed ends having annular surfaces on opposed sides of said radial flange portion surrounding said body portion and an inwardly tapered annular outer peripheral portion, and clinching surfaces circumscribing said opposed ends and clinching surfaces tapered radially outwardly from said radial flange portion to said opposed ends.

9. A clinch-type female fastener, comprising:
a body portion having opposed ends and a bore extending through said body portion through said opposed ends; and
a radial flange portion integral with said body portion midway between said opposed ends including generally parallel planar annular surfaces on opposed sides of said radial flange portion surrounding said body portion each having a plurality of spaced radial grooves and an inwardly tapered annular outer peripheral portion.

10. The clinch-type female fastener as defined in claim 9, wherein said radial grooves each include radial side walls and a bottom wall spaced below a plane of said planar annular surfaces.

11. A double-sided clinch-type female fastener for attachment to a panel formed of a deformable metal, comprising:
a body portion having opposed ends and a bore extending through said body portion through said opposed ends;
a radial flange portion integral with said body portion midway between said opposed ends having generally parallel planar annular surfaces on opposed sides of said radial flange portion surrounding said body portion and an inwardly tapered annular outer peripheral portion; and
wherein said clinch-type female fastener is symmetrical along and about a longitudinal axis of said bore.

12. The clinch-type female fastener as defined in claim 11, wherein said body portion includes outer clinching surfaces circumscribing said opposed ends tapered radially outwardly from said radial flange portion to said opposed ends.

13. The clinch-type female fastener as defined in claim 11, wherein said outer peripheral portion of said radial flange portion is generally circular.

14. The clinch-type female fastener as defined in claim 13, wherein said generally parallel planar annular surfaces on opposed sides of said radial flange portion each include a plurality of spaced radial grooves.

15. The clinch-type female fastener as defined in claim 14, wherein said radial grooves each include radial side walls and a bottom wall spaced below a plane of said planar annular surfaces.

16. The clinch-type female fastener as defined in claim 14, wherein said radial grooves include an end wall each spaced from said body portion.

17. The clinch-type female fastener as defined in claim 16, wherein said radial grooves extend to said annular outer peripheral portion of said radial flange portion.

18. A method of attaching a self-attaching female fastener to a panel, said female fastener including a body portion having opposed end portions, a bore extending through said body portion through said opposed end portions and through a radially outwardly inclined surface, and a radial flange portion integral with said body portion midway between said opposed end portions having an annular peripheral portion, said method comprising the following steps:

receiving either one of said end portions of said body portion of said self-attaching female fastener through an opening in a panel;

deforming said annular outer peripheral portion of said radial flange portion toward said one of said end portions of said body portion forming an annular groove surrounding said body portion; and deforming an annular panel portion surrounding said opening radially inwardly beneath said radially outwardly inclined surface of said body portion.

19. A method of attaching a self-attaching female fastener to a panel, said female fastener including a body portion having opposed end portions and a bore extending through said body portion through said opposed end portions, and a radial flange portion integral with said body portion midway between said opposed end portions including generally parallel annular surfaces circumscribing said body portion each having circumferentially spaced generally radial grooves and an outer peripheral portion, said method comprising the following steps:

receiving said either one of said end portions of said body portion of self-attaching female fastener through an opening in a panel;

deforming said annular outer peripheral portion of said radial flange portion toward said one of said end portions of said body portion, thereby forming an annular groove surrounding said body portion; and deforming an annular panel portion surrounding said opening in said panel into said annular groove and into said circumferentially spaced generally radial grooves of said radial flange portion adjacent said one of said end portions of said body portion.

20. A method of attaching a symmetrical clinch-type female fastener element to a panel, said female fastener element including a body portion having opposed end portions and a bore extending through said body portion through said opposed end portions, and a radial flange portion integral with said body portion midway between said opposed end portions having an annular outer peripheral portion, and wherein said clinch-type female fastener element is symmetrical along and about a longitudinal axis of said bore, said method comprising the following steps:

receiving either one of said end portions of said body portion of said symmetrical clinch-type female fastener element through an opening in a panel;

deforming said annular outer peripheral portion of said radial flange portion towards said one of said end portions of said body portion thereby forming an annular groove surrounding said body portion; and deforming an annular panel portion surrounding said opening in said panel into said annular groove.

21. The method of attaching a symmetrical clinch-type female fastener element to a panel as defined in claim 20, wherein said annular outer peripheral portion of said radial flange portion includes inwardly radially tapered surfaces and said method including deforming said annular outer peripheral portion of said flange portion toward said one of said end portions of said body portion until said inwardly radially tapered surface adjacent said one of said end portions of said body portion extends generally perpendicular to a longitudinal axis of said bore, thereby forming an annular bearing surface supporting said panel.

22. The method of attaching a symmetrical clinch-type female fastener element to a panel as defined in claim 20, wherein each of said end portions of said body portion includes a radially outwardly inclined surface, said method including deforming said panel portion radially inwardly beneath said radially outwardly inclined surface.

23. The method of attaching a symmetrical clinch-type female fastener element to a panel as defined in claim 20, wherein said radial flange portion includes generally parallel annular surfaces having radial grooves surrounding said end portions, said method including deforming said panel into said radial grooves.

24. The method of attaching a symmetrical clinch-type female fastener element to a panel as defined in claim 20, wherein said method includes driving said one of said end portions of said body portion against said panel piercing said opening in said panel.

\* \* \* \* \*